US012668461B2

(12) United States Patent
Tabutin et al.

(10) Patent No.: US 12,668,461 B2
(45) Date of Patent: Jun. 30, 2026

(54) SYSTEM FOR MEASURING LOAD ON LOWER BOOM BLOCK YOKE OF PIPELAYERS

(71) Applicant: Caterpillar Inc., Peoria, IL (US)

(72) Inventors: Simon Tabutin, Saint Marcel en Murat (FR); Sean David Lawson, East Peoria, IL (US); Aaron Gnagey, Morton, IL (US)

(73) Assignee: Caterpillar Inc., Peoria, IL (US)

( * ) Notice: Subject to any disclaimer, the term of this patent is extended or adjusted under 35 U.S.C. 154(b) by 439 days.

(21) Appl. No.: 18/310,618

(22) Filed: May 2, 2023

(65) Prior Publication Data

US 2024/0367949 A1 Nov. 7, 2024

(51) Int. Cl.

| | |
|---|---|
| ***B66C 15/06*** | (2006.01) |
| ***B66C 23/36*** | (2006.01) |
| ***B66C 23/90*** | (2006.01) |

(52) U.S. Cl.

CPC ............ *B66C 15/065* (2013.01); *B66C 23/36* (2013.01); *B66C 23/905* (2013.01); *B66C 2700/08* (2013.01)

(58) Field of Classification Search

CPC .................................................... B66C 15/065

USPC ............................................................ 73/158

See application file for complete search history.

(56) References Cited

U.S. PATENT DOCUMENTS

| | | | | |
|---|---|---|---|---|
| 4,490,936 | A * | 1/1985 | Svendsen | A01K 73/06 254/332 |
| 2021/0094802 | A1* | 4/2021 | Wehrstedt | B66C 13/46 |
| 2021/0094803 | A1 | 4/2021 | Caldwell et al. | |
| 2021/0101788 | A1* | 4/2021 | Caldwell | B66C 13/16 |

FOREIGN PATENT DOCUMENTS

| | | | |
|---|---|---|---|
| CA | 2983837 | C | 10/2020 |
| GB | 1266822 | A | 3/1972 |
| JP | 6679641 | B2 | 4/2020 |

* cited by examiner

*Primary Examiner* — Walter L Lindsay, Jr.
*Assistant Examiner* — Philip T Fadul

(57) ABSTRACT

A system for measuring load, from a cable, associated with a boom of a pipelayer is disclosed. The system includes a linkage configured to be coupled between a boom block, engaged with the cable, and a portion of the pipelayer. In addition, the system includes a load cell coupled between the linkage and the boom block for measuring the load, from the cable, on the linkage. A measurement load path, of the load cell, is aligned with a load path, of the load, between the boom block and the linkage.

18 Claims, 5 Drawing Sheets

SYSTEM FOR MEASURING LOAD ON LOWER BOOM BLOCK YOKE OF PIPELAYERS

TECHNICAL FIELD

The present disclosure relates to pipelayers having booms for performing load lifting and lowering operations. More particularly, the present disclosure relates to a system for measuring load on a lower boom block yoke of a pipelayer.

BACKGROUND

Pipelayers are generally used to suspend and place loads, such as pipelines, at an installation site or the like. A pipelayer typically includes a boom for handling such loads. In addition, the pipelayer includes a boom hoisting assembly for controlling a position of the boom during the installation of loads. During the installation, the pipelayer may be subjected to forces based on a weight of a load sustained by the boom and a position of the load relative to the pipelayer. It is desirable to accurately measure such forces for effective installation of loads.

Canadian Patent No. 2,983,837 discloses a pipelayer machine. The pipelayer machine includes a main body, a side boom pivotally connected to the main body, a boom winch connected to the side boom by a boom cable, a luff block attached to the main body near the boom winch and the boom cable running through the luff block, a hook winch, and a sensor array. The sensor array includes a load pin, a luff accelerometer, a boom winch encoder, a hook winch encoder, and a vehicle accelerometer. The load pin pivotally connects the luff block to the main body of the pipelayer machine. The luff accelerometer is positioned on the luff block and measures a position of the luff block. The boom winch encoder measures the direction of the boom winch and the speed of winding/unwinding. The hook winch encoder measures the direction of the hook winch and the speed of winding/unwinding. The vehicle accelerometer measures the inclination of the vehicle.

SUMMARY OF THE INVENTION

In one aspect, the disclosure relates to a system for measuring load, from a cable, associated with a boom of a pipelayer. The system includes a linkage configured to be coupled between a boom block, engaged with the cable, and a portion of the pipelayer. In addition, the system includes a load cell coupled between the linkage and the boom block for measuring the load, from the cable, on the linkage. A measurement load path, of the load cell, is aligned with a load path, of the load, between the boom block and the linkage.

In another aspect, the disclosure is directed to a pipelayer. The pipelayer includes a main frame, a boom, a first boom block, a linkage, a second boom block, a cable, and a load cell. The boom is configured to pivot with respect to the main frame to allow lifting and lowering of the boom. The boom defines a first end coupled to the main frame and a second end away from the main frame. The first boom block is coupled to the second end of the boom. The linkage is coupled to main frame. The second boom block is coupled between the linkage and the first boom block. The cable is engaged with the first boom block and the second boom block and configured to be actuated to pivot the boom. The load cell is coupled between the linkage and the second boom block for measuring load, from the cable, on the linkage. A measurement load path, of the load cell, is aligned with a load path, of the load, between the second boom block and the linkage.

DETAILED DESCRIPTION

Reference will now be made in detail to specific embodiments or features, examples of which are illustrated in the accompanying drawings. Generally, corresponding reference numbers may be used throughout the drawings to refer to the same or corresponding parts, e.g., 1, 1', 1", 101 and 201 could refer to one or more comparable components used in the same and/or different depicted embodiments.

The term “about” used in conjunction with a numerical value or range modifies that value or range by extending the boundaries above and below the numerical values set forth. In general, the term “about” is used herein to modify a numerical value above and below the stated value by 10%.

Figure 1:
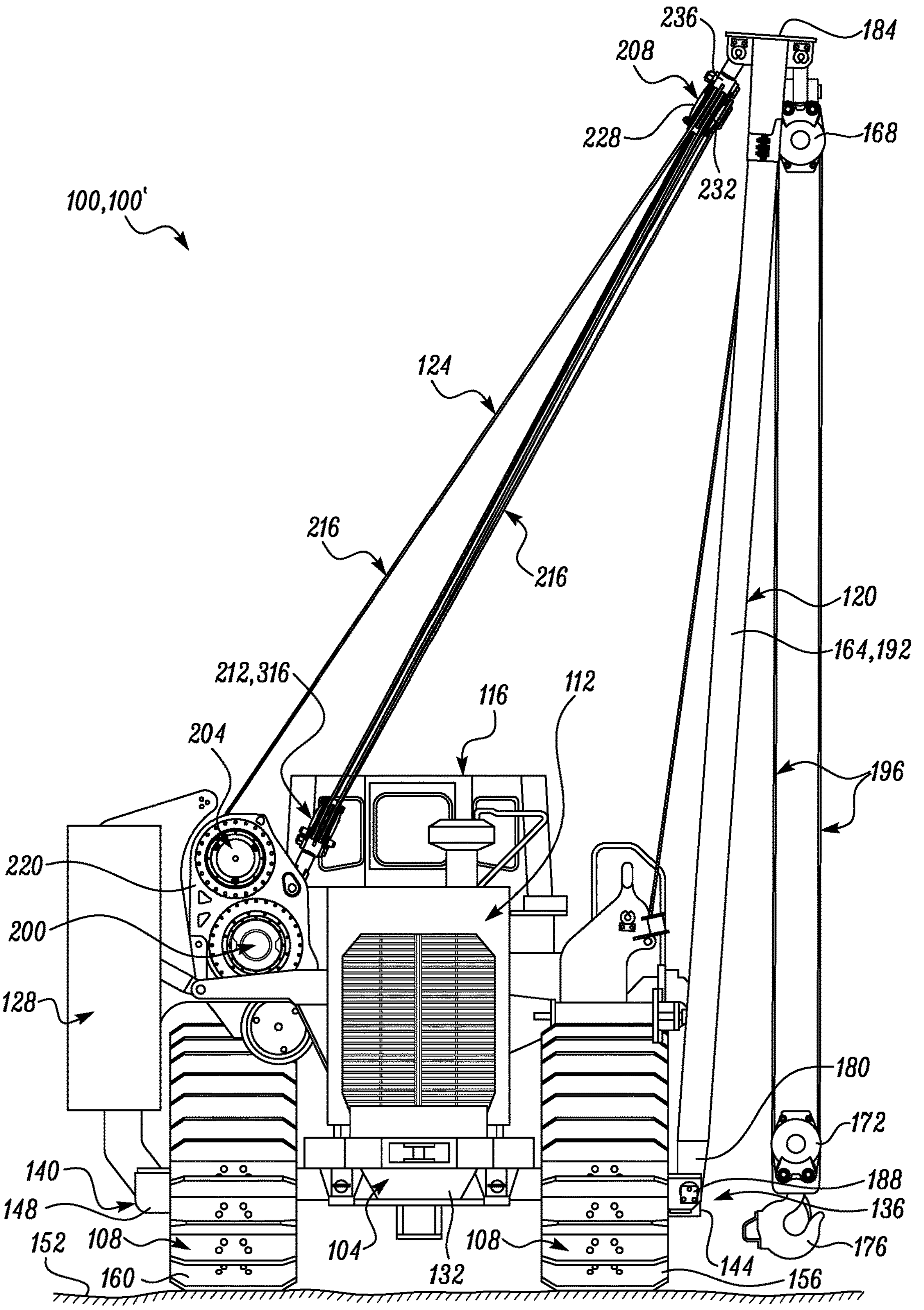
FIG. 1 is a front view of an exemplary pipelayer having a boom and a cable associated with the boom, in accordance with an embodiment of the present disclosure.

Referring to FIG. 1, an exemplary machine 100 is shown. In the illustrated embodiment, the machine 100 is embodied as a pipelayer 100' used to perform pipelaying operations. The pipelaying operations may include but not limited to lifting and/or lowering of a load, such as a conduit segment, a pipe segment, a culvert segment, a drainage segment, and the like, and installing the load at an installation site, such as a trench. In an exemplary pipelaying operation, a pipe segment (to be installed in a trench) is lifted off of the ground by the pipelayer 100', placed over top of the trench, and lowered into the trench by the pipelayer 100'.

Although references to the pipelayer 100' are used, aspects of the present disclosure may also be applicable to other work machines equipped with booms for suspending loads, such as dragline excavators, rope shovels, cranes, etc., and references to the pipelayer 100' in the present disclosure is to be viewed as purely exemplary.

The pipelayer 100' (or the machine 100) includes a main frame 104, traction devices 108, a propulsion system 112, an operator cabin 116, a boom assembly 120, a boom hoisting assembly 124, and a counterweight assembly 128. The main frame 104 supports one or more components/assemblies of the pipelayer 100', such as the propulsion system 112, the operator cabin 116, the boom assembly 120, the boom hoisting assembly 124, and the counterweight assembly 128, although other known components and structures may be supported by the main frame 104, as well. The main frame

104 may define a forward end 132 and a rearward end (not shown) opposite to the forward end 132. The forward end 132 and the rearward end may be defined in relation to an exemplary direction of travel of the pipelayer 100', with said direction of travel being defined from the rearward end towards the forward end 132.

Also, the main frame 104 may define two lateral sides, namely, a first lateral side 136 and a second lateral side 140 opposite to the first lateral side 136. The two lateral sides 136, 140 may be located transversely relative to the exemplary direction of travel of the pipelayer 100'. In addition, the main frame 104 may include a first track roller frame 144 and a second track roller frame 148. The first track roller frame 144 may be disposed at the first lateral side 136 of the pipelayer 100' and, the second track roller frame 148 may be disposed at the second lateral side 140 of the pipelayer 100'.

The traction devices 108 may support the main frame 104 (and thus the overall pipelayer 100') over ground 152 and may be powered by the propulsion system 112 so as to facilitate movement of the pipelayer 100' over an expanse of the installation site. The traction devices 108 may include tracks, or wheels, or a combination thereof. As shown in FIG. 1, the pipelayer 100' includes two traction devices 108, namely, a first track 156 and a second track 160. The first track 156 may be coupled to the first track roller frame 144 and, the second track 160 may be coupled to the second track roller frame 148. In other embodiments, it may be contemplated that higher or lesser number of tracks may be used in the pipelayer 100'.

The propulsion system 112 may include a power compartment 112' and a power source (not shown) provided within the power compartment 112. The power source may include a combustion engine, or an electrical power source, or a combination thereof. The power source may be configured to generate an output power required to operate various systems or assemblies on the pipelayer 100", with one operation exemplarily involving a pivoting of the boom assembly 120 with respect to the main frame 104 to lift or lower loads.

The operator cabin 116 may be supported over the main frame 104. The operator cabin 116 may facilitate stationing of one or more operators therein, to monitor and control the operations of the pipelayer 100. Also, the operator cabin 116 may house various components and controls of the pipelayer 100', access to one or more of which may help the operators to perform the pipelaying operations. For example, the various components and controls of the pipelayer 100' may include, but not limited to, joysticks, switches, and the likes, to facilitate an operator in performing the pipelaying operations.

The boom assembly 120 may be disposed on the first lateral side 136 of the main frame 104. The boom assembly 120 is configured to lift and lower a load (e.g., pipe segment). The boom assembly 120 includes a boom 164, a first hook block 168, a second hook block 172, and a lifting hook 176. The boom 164 defines a first end 180 and a second end 184 opposite to the first end 180. The first end 180 of the boom 164 is coupled to the main frame 104. For example, the first end 180 of the boom 164 may be pivotally coupled to the first track roller frame 144, using one or more hinge pins 188. The second end 184 of the boom 164 is defined away from the main frame 104.

Further, the boom 164 may be formed of one or more leg segments 192. In the present embodiment, as shown in FIG. 1, the boom 164 includes two leg segments 192, only one of which is visible in FIG. 1. The two leg segments 192 extend between the first end 180 and the second end 184 of the boom 164. For instance, the two leg segments 192 are pivotally coupled to the first track roller frame 144 at the first end 180 of the boom 164 (via the hinge pins 188) and, are coupled to one another at the second end 184 of the boom 164. In this illustrated configuration, the two leg segments 192 impart a substantially elongated and triangular configuration to the boom 164. In other embodiments, the boom 164 may include single or multiple leg segments, based on application requirements.

The boom 164 is configured to pivot with respect to the main frame 104. The boom 164 may be pivotable between a raised position (as shown in FIG. 1) and a lowered position (not shown) with respect to the main frame 104. In an example, the raised position of the boom 164 may be a substantially vertical or stowed position of the boom 164 that may facilitate tramming of the pipelayer 100' across the site, whereas the lowered position of the boom 164 may be a substantially horizontal position of the boom 164 that may facilitate reach in order to suspend the load over a trench.

The first hook block 168 may be pivotally coupled to the second end 184 of the boom 164. The second hook block 172 may be operably coupled to the first hook block 168 using at least one hook cable 196. The hook cable 196 may be actuated using a hook winch 200 supported on the main frame 104. Further, the lifting hook 176 may be coupled to the second hook block 172. The lifting hook 176 may be configured to suspend the load, such as a pipe section, to be lifted (or lowered). During a pipelaying operation, the hook cable 196 may be actuated by the hook winch 200 to raise or lower the second hook block 172 and the lifting hook 176 relative to the ground 152.

The boom hoisting assembly 124 is now discussed. The boom hoisting assembly 124 may operate in a manner to move (e.g., pivot) the boom 164 with respect to the main frame 104. For example, the boom hoisting assembly 124 facilitates pivoting of the boom 164 between the raised position and the lowered position with respect to the main frame 104. The boom hoisting assembly 124 includes a winch 204 (hereinafter referred to as “boom winch 204”), a first boom block 208, a second boom block 212, and a cable 216 (hereinafter referred to as “boom cable 216”).

Figure 2:
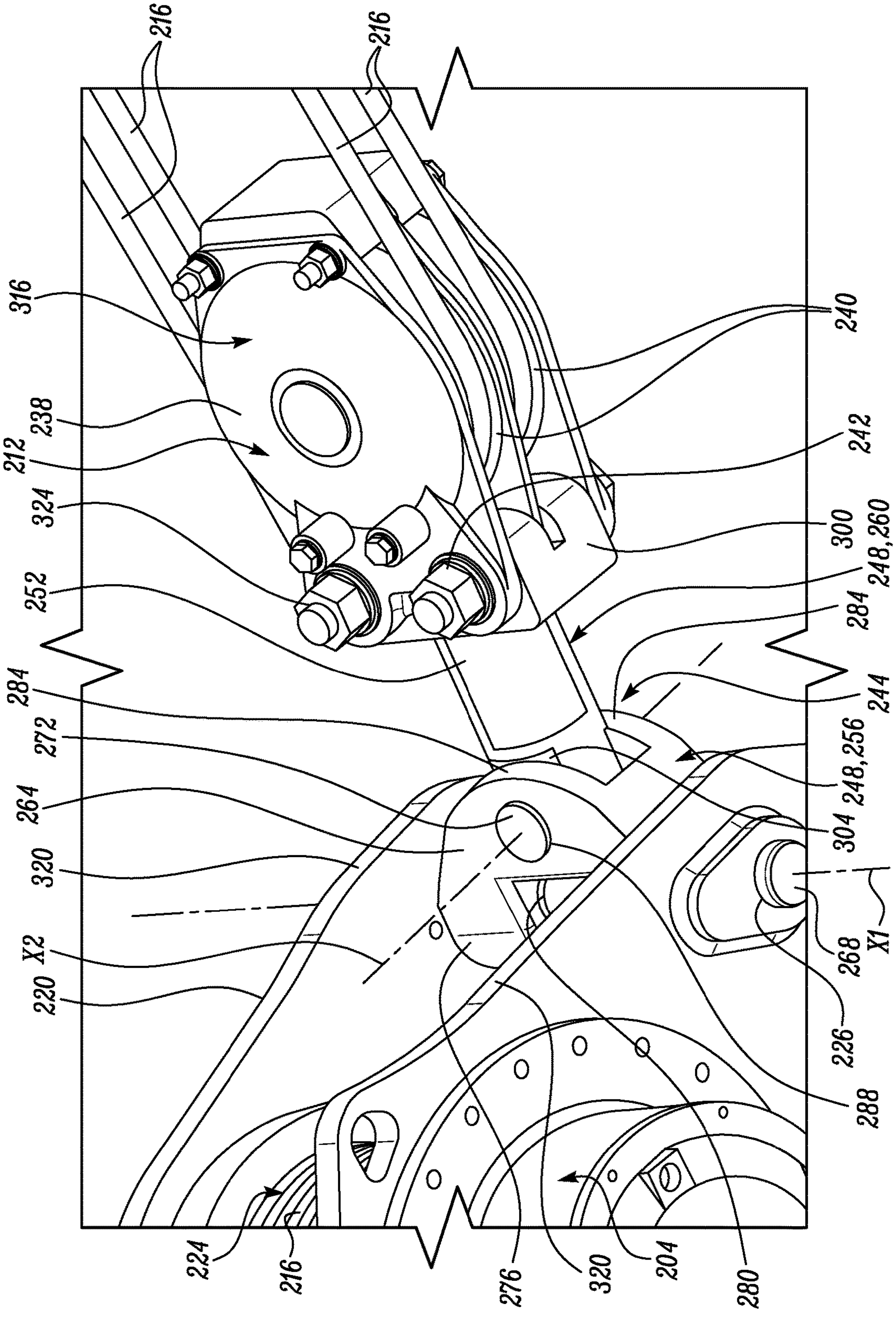
FIG. 2 is a partial perspective view of the exemplary pipelayer illustrating a system for measuring load from the cable, in accordance with an embodiment of the present disclosure.
Figure 5:
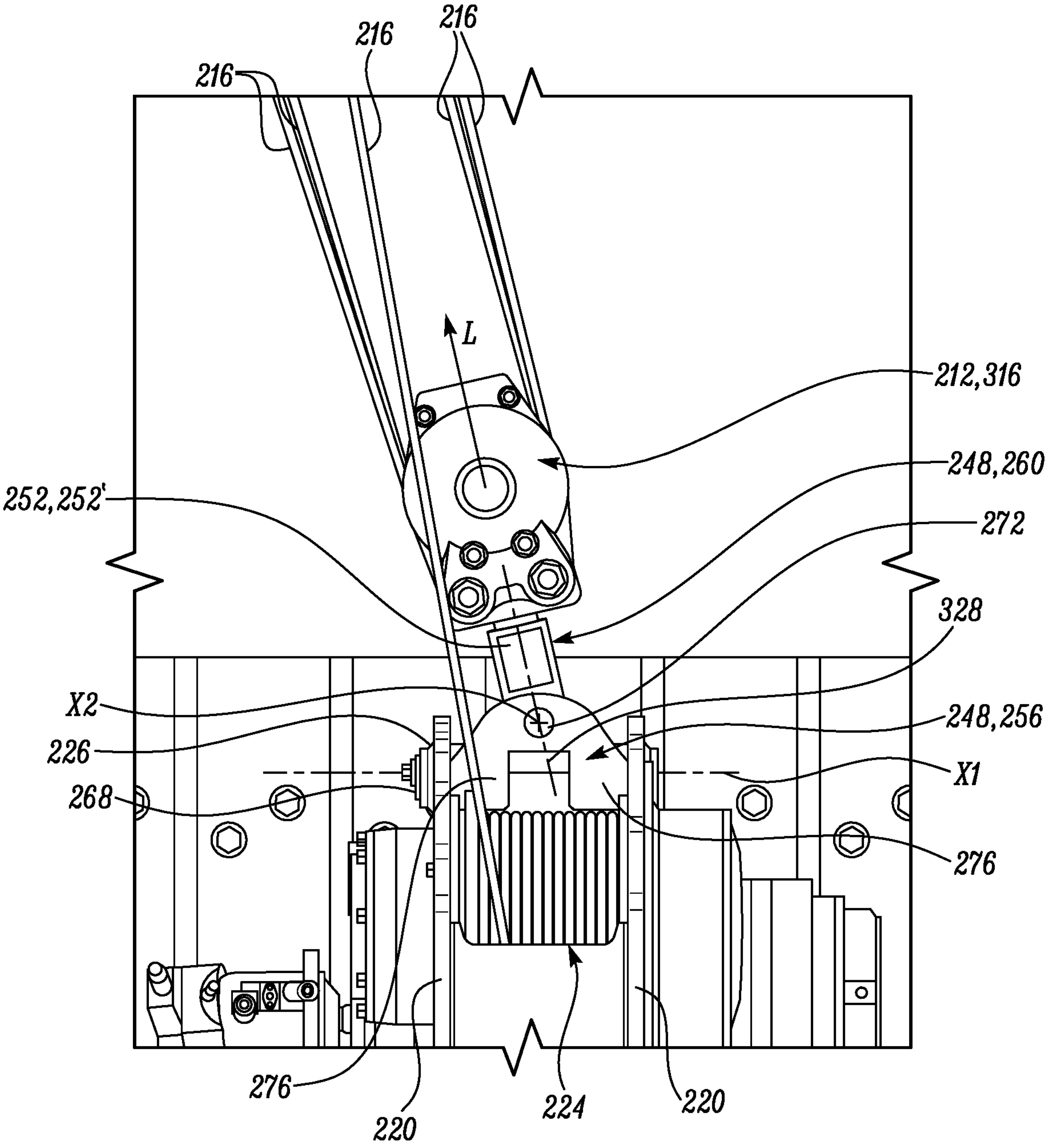
FIG. 5 is a partial elevational view of the exemplary pipelayer illustrating alignment of the system with the load from the cable along a plane perpendicular to the vertical plane, in accordance with an embodiment of the present disclosure.

The boom winch 204 may include a frame 220 and a drum 224 disposed at least partially within the frame 220 (as shown in FIGS. 2 and 5). The frame 220 may be disposed towards the second lateral side 140 of the main frame 104. The frame 220 may define a pair of coaxial mounting bores 226. The drum 224 may be configured to operate in a manner to actuate the boom cable 216. For example, the drum 224 may be powered (e.g., via the power source) to rotate in one direction for winding the boom cable 216 thereon and, rotate in the other opposite direction for unwinding the boom cable 216 therefrom. The winding or unwinding of the boom cable 216 around the drum 224 may result in pivoting of the boom 164 between the raised position and the lowered position with respect to the main frame 104.

The first boom block 208 may include a first housing 228 and one or more first pulleys 232 coupled to the first housing 228. The first pulleys 232 may be configured to receive and guide the boom cable 216 between the boom winch 204 and the second boom block 212. The first boom block 208 is coupled to the second end 184 of the boom 164. For example, the first housing 228 of the first boom block 208 defines a first mounting portion 236 to facilitate pivotal coupling between the first boom block 208 and the second end 184 of the boom 164.

The second boom block 212 may be supported on the main frame 104. For example, as shown in FIG. 2, the second boom block 212 is supported on the frame 220 associated with the boom winch 204. The second boom block 212 may include a second housing 238 and a pair of second pulleys 240 coupled to the second housing 238. The second housing 238 may define one or more mounting through-holes 242. The second pulleys 240 may receive the boom cable 216 from the first boom block 208 and guide the boom cable 216 back to the first boom block 208 (or the boom winch 204) to operably couple the second boom block 212 with the first boom block 208 and the boom winch 204.

In this illustrated configuration, the boom cable 216 may run back and forth between the first pulleys 232 of the first boom block 208 and the second pulleys 240 of the second boom block 212, four times. However, it should be noted that the boom cable 216 may run fewer or more times depending on the number of first and second pulleys 232, 240. This engagement between the boom winch 204, the first boom block 208, and the second boom block 212, (formed via the boom cable 216 extending therebetween) may aid the boom winch 204 in pivoting the boom 164 with respect to the main frame 104.

During the pipelaying operation, the boom 164 may be subjected to various forces (or moments), for example, due to weight and position of the load suspended from the lifting hook 176. Such forces (or moments), if unaccounted for, may affect the stability of the pipelayer 100', and in worst scenarios, may result in tipping of the pipelayer 100'. Therefore, determination of such forces (or moments) is necessary to avoid dangerous tipping situations and hence, to enhance the stability of the pipelayer 100. To determine the forces (or moments) applied to the boom 164 due to the suspended load, load (e.g., tension) from the boom cable 216 is to be measured.

Figure 3:
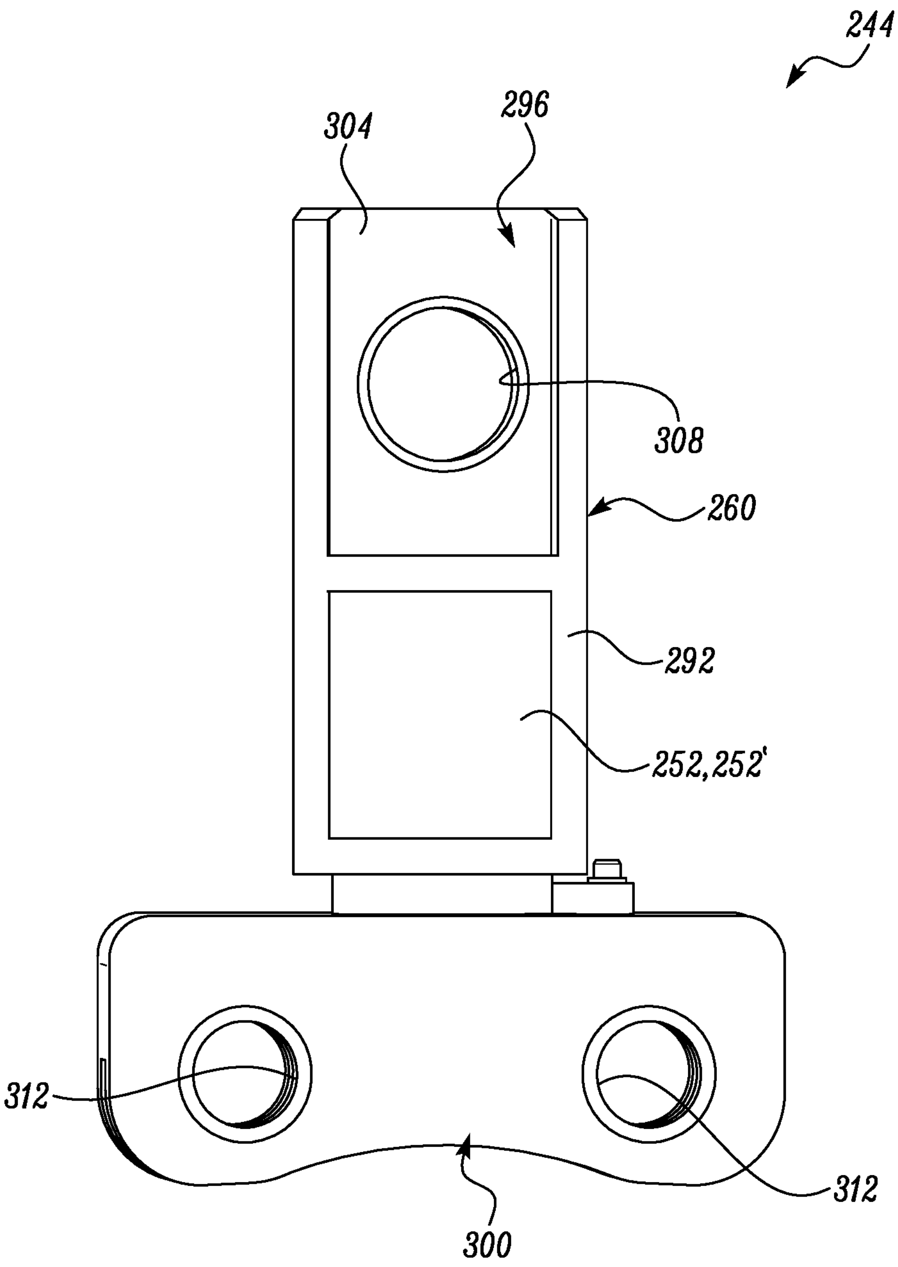
FIG. 3 illustrates a yoke of the system, in accordance with an embodiment of the present disclosure.

Referring to FIGS. 2 and 3, a system 244 for measuring load from the boom cable 216 is discussed. The system 244 includes a linkage 248 and a load cell 252. Each of the linkage 248 and the load cell 252 is discussed in detail below.

The linkage 248 may include a clevis bracket 256 and a yoke 260. The clevis bracket 256 may include a body 264, a first pin 268, and a second pin 272. The body 264 may define a pair of spaced-apart, parallel protrusions 276, and a pair of first through-holes 280. The protrusions 276 may extend outwardly and away from the body 264. The first through-holes 280 may be defined at their corresponding protrusions 276. The first through-holes 280 are axially aligned to one another to receive the first pin 268. Further, the body 264 may define a pair of spaced-apart, parallel projections 284, and a pair of second through-holes 288. The projections 284 may extend outwardly from the body 264 and opposite to the protrusions 276. The projections 284 are spaced from one another in a direction transverse to a direction in which the protrusions 276 are spaced from one another. The second through-holes 288 may be defined at their corresponding projections 284. The second through-holes 288 are axially aligned to one another to receive the second pin 272.

Referring to FIG. 3, the yoke 260 includes a body 292. The body 292 may be a solid, hollow, or a partially hollow shaft structure. The body 292 may define a first engagement portion 296 and a second engagement portion 300. The first engagement portion 296 may define a first flat portion 304 and a first mounting through-bore 308 extending through the first flat portion 304. The second engagement portion 300 may be disposed longitudinally opposite to the first engagement portion 296 along a length of the yoke 260. The second engagement portion 300 may define one or more second mounting bores 312.

The clevis bracket 256 and the yoke 260 are coupled to one another in a manner such that the yoke 260 pivots with respect to the clevis bracket 256. In an exemplary coupling of the clevis bracket 256 and the yoke 260, as shown in FIG. 2, the first flat portion 304 (of the yoke 260) is received in a space between the projections 284 (of the clevis bracket 256) in a manner to axially align the first mounting through-bore 308 (of the yoke 260) with the second through-holes 288 (of the clevis bracket 256). Next, the second pin 272 is inserted through the second through-holes 288 and the first mounting through-bore 308 to pivotally couple the yoke 260 with the clevis bracket 256.

The linkage 248 is configured to be coupled between the boom block 316 and a portion 320 of the pipelayer 100'. For example, the yoke 260 of the linkage 248 is coupled to the boom block 316 whereas, the clevis bracket 256 is coupled to the portion 320 of the pipelayer 100'. In the present embodiment, the boom block 316 corresponds to the second boom block 212. The portion 320 of the pipelayer 100' may be defined at the main frame 104. As shown in FIG. 2, the portion 320 is defined at the frame 220 associated with the boom winch 204.

In an exemplary assembly of the linkage 248 with the boom block 316 (or the second boom block 212), the second engagement portion 300 (of the yoke 260) is received within the second housing 238 of the second boom block 212 in a manner to axially align the second mounting bores 312 (of the yoke 260) with the mounting through-holes 242 (of the second boom block 212). Subsequent to this, bolts 324 are inserted through the second mounting bores 312 and the mounting through-holes 242, and are fastened to fixedly couple the yoke 260 to the second boom block 212.

Further, in an exemplary assembly of the linkage 248 with the portion 320 (or the frame 220), the protrusions 276 (of the clevis bracket 256) are received within the frame 220 in a manner to axially align the first through-holes 280 (of the clevis bracket 256) with the mounting bores 226 of the frame 220. Subsequent to this, the first pin 268 is inserted through the first through-holes 280 and the mounting bores 226 to pivotally couple the clevis bracket 256 to the portion 320 (or the frame 220).

The linkage 248 may be coupled to the portion 320 to define a multi-axis coupling with respect to the portion 320. The multi-axis coupling may correspond to a universal coupling that facilitate movement of the yoke 260 (and the second boom block 212, 316) about multiple axis of rotations with respect to the portion 320 (or the frame 220). In the present embodiment, the universal coupling may facilitate movement of the yoke 260 (and the second boom block 212, 316) about two different axis of rotations, namely a first axis of rotation ‘X1’ and a second axis of rotation ‘X2’.

Figure 4:
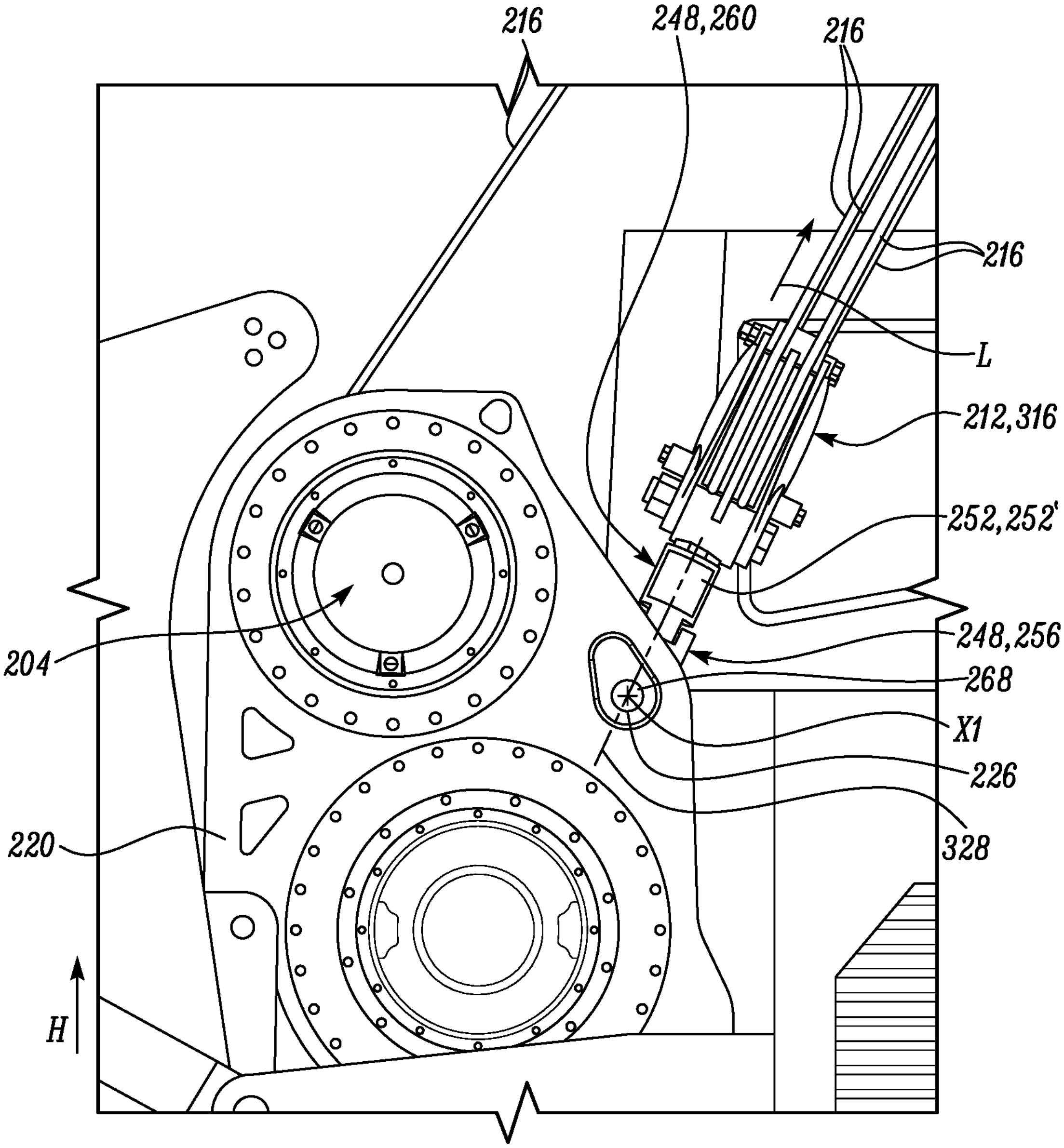
FIG. 4 is a partial front view of the exemplary pipelayer illustrating alignment of the system with the load from the cable along a vertical plane defined along a height of the pipelayer, in accordance with an embodiment of the present disclosure.

For example, as shown in FIGS. 2, 4, and 5, the coupling between the clevis bracket 256 and the portion 320 facilitates the clevis bracket 256 to pivot with respect to the portion 320 about the first axis of rotation ‘X1’. The pivoting of the clevis bracket 256 about the first axis of rotation ‘X1’ enables the linkage 248 and the second boom block 212, 316 to move in a vertical plane (e.g., plane of FIG. 4) defined along a height (measured in a direction ‘H’) of the pipelayer 100". In addition, the coupling between the clevis bracket 256 and the yoke 260 facilitates the yoke 260 (and the second boom block 212) to pivot relative to the clevis bracket 256 about the second axis of rotation ‘X2’. In the present embodiment, the second axis of rotation ‘X2’ is perpendicular to the first axis of rotation 'X1'. Accordingly, the pivoting of the yoke 260 about the second axis of rotation 'X2' enables the yoke 260 and the second boom block 212 to move in a plane (e.g., plane of FIG. 5) perpendicular to the vertical plane. In other embodiments, the second axis of rotation 'X2' may be at any suitable angle with respect to the first axis of rotation 'X1' based on application requirements.

The load cell 252 is now discussed. The load cell 252 is coupled between the linkage 248 and the second boom block 212, 316. In the present embodiment, the load cell 252 is coupled to the yoke 260 of the linkage 248. In an example, as shown in FIG. 3, the load cell 252 is disposed within the body 292 of the yoke 260. The load cell 252 is coupled to the yoke 260 in an orientation such that a measurement load path (shown in dashed line 328, in FIGS. 4 and 5) of the load cell 252 is aligned with a load path (shown by an arrow 'L', in FIGS. 4 and 5) of the load, between the second boom block 212 and the linkage 248, from the boom cable 216. This alignment may facilitate the load cell 252 to generate a signal corresponding to a tension sustained in the yoke 260 in response to the load (actual load) applied from the boom cable 216 on the linkage 248 (or the yoke 260).

In the present embodiment, the load cell 252 includes one or more strain gauges 252'. However, it may be contemplated that in other embodiments, the load cell 252 may be any type of load sensor, such as a piezoelectric type load sensor, a pneumatic type load sensor, a hydraulic type load sensor, and so on, based on application requirements.

In some embodiments, the load cell 252 may be disposed within the second pin 272 in an orientation such that the measurement load path of the load cell 252 may be aligned with the load path of the load, between the second boom block 212 and the linkage 248, from the boom cable 216.

INDUSTRIAL APPLICABILITY

During the pipelaying operation, the boom 164 may be subjected to various forces (or moments), for example, due to weight and position of the load suspended from the lifting hook 176. Such forces (or moments), if unaccounted for, may affect the stability of the pipelayer 100', and in worst scenarios, may result in tipping of the pipelayer 100'. Therefore, determination of such forces (or moments) is necessary to avoid dangerous tipping situations and hence, to enhance the stability of the pipelayer 100'. To determine the forces (or moments) applied to the boom 164 due to the suspended load, load (e.g., tension) from the boom cable 216 is to be measured.

In this regard, the present disclosure provides the system 244, e.g., the linkage 248 having the clevis bracket 256 and the yoke 260 and the load cell 252 coupled between the second boom block 212, 316 and the linkage 248 (e.g., to the yoke 260). Coupling the load cell 252 to the yoke 260 may prevent the load cell 252 from directly contacting dirt, debris, or other foreign material present on the installation site. In addition, a hard-wired connection between the load cell 252 and other electronic/electrical devices (e.g., a controller associated with the pipelayer 100') may be established for fast, reliable, and inexpensive transfer of information (signals) between the load cell 252 and the electronic/electrical devices.

Further, pivoting of the clevis bracket 256 (with respect to the frame 220) about the first axis of rotation 'X1' allows the yoke 260 and the second boom block 212, 316 to follow the pivoting movement of the boom 164 in the vertical plane (as shown in FIG. 4), whereas pivoting of the yoke 260 (with respect to the clevis bracket 256) about the second axis of rotation 'X2' allows the yoke 260 and the second boom block 212, 316 to follow the pivoting movement of the boom 164 in the plane perpendicular to the vertical plane (as shown in FIG. 5). Such pivoting of the yoke 260 and the second boom block 212, 316 about two axes of rotation facilitates alignment of the measurement load path (shown in dashed line 328, in FIGS. 4 and 5) of the load cell 252 with the load path (shown by the arrow 'L', in FIGS. 4 and 5) of the load, between the second boom block 212 and the linkage 248, from the boom cable 216. This alignment allows the load cell 252 to generate a signal corresponding to a tension sustained in the yoke 260 in response to the actual load applied from the boom cable 216 on the linkage 248 (or the yoke 260), rather than any component of the load applied from the boom cable 216.

Generating the signal corresponding to the tension sustained in the yoke 260 in response to the actual load from the boom cable 216 aids in accurately determining the forces (or moments) applied to the boom 164 due to the suspended load. For example, the load cell 252 may transmit the signal (indicative of the tension in response to the actual load from the boom cable 216) to a controller (not shown) associated with the pipelayer 100'. The controller may process the signal received from the load cell 252 to accurately determine the forces (or moments) applied to the boom 164 due to the load suspended from the lifting hook 176.

The system 244 may be retrofitted on any machine equipped with a boom, such as pipelayers, dragline excavators, rope shovels, cranes, etc., with little or no modification to existing systems, in turn, improving flexibility and compatibility. The system 244 facilitates a simple, fast, and accurate measurement of the actual load (and not any component of the load) from the boom cable 216. Directly measuring the actual load from the boom cable 216 (instead of any component of the load from the boom cable 216) may significantly reduce processing time and power requirement of the controller for determining the forces (or moments) applied to the boom 164 during the pipelaying operation. This may enable an operator of the pipelayer 100' to control the pipelayer 100' safely and efficiently.

Unless explicitly excluded, the use of the singular to describe a component, structure, or operation does not exclude the use of plural such components, structures, or operations or their equivalents. The use of the terms "a" and "an" and "the" and "at least one" or the term "one or more," and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B" or one or more of A and B") is to be construed to mean one item selected from the listed items (A or B) or any combination of two or more of the listed items (A and B; A, A and B; A, B and B), unless otherwise indicated herein or clearly contradicted by context. Similarly, as used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

It will be apparent to those skilled in the art that various modifications and variations can be made to the system and/or the pipelayer of the present disclosure without departing from the scope of the disclosure. Other embodiments will be apparent to those skilled in the art from consideration of the specification and practice of the system and/or the pipelayer disclosed herein. It is intended that the specification and examples be considered as exemplary only, with a true scope of the disclosure being indicated by the following claims and their equivalent.

What is claimed is:

1. A system for measuring load from a cable associated with a boom of a pipelayer, the system comprising:
- a linkage coupled between a boom block engaged with the cable and a portion of the pipelayer; and
- a load cell coupled between the linkage and the boom block and configured to measure the load from the cable on the linkage,
- wherein a measurement load path of the load cell is aligned with a load path of the load between the boom block and the linkage,
- wherein the linkage includes:
  - a clevis bracket pivotable relative to the portion of the pipelayer about a first axis of rotation, and
  - a yoke pivotable relative to the clevis bracket about a second axis of rotation different from the first axis of rotation, and
- wherein a first end of the load cell is coupled to the yoke and a second end of the load cell opposite the first end is coupled to an engagement portion coupled to the boom block.

2. The system of claim 1,
- wherein the pipelayer includes a winch to actuate the cable to pivot the boom, and
- wherein the portion includes a frame associated with the winch.

3. The system of claim 1, wherein the linkage defines a multi-axis coupling with respect to the portion of the pipelayer.

4. The system of claim 3, wherein the multi-axis coupling corresponds to a universal coupling.

5. The system of claim 1, wherein the pivoting of the clevis bracket about the first axis of rotation enables the linkage to move in a vertical plane defined along a height of the pipelayer.

6. The system of claim 5, wherein the second axis of rotation is perpendicular to the first axis of rotation.

7. The system of claim 5, wherein the load cell is configured to generate a signal corresponding to a tension sustained in the yoke in response to the load from the cable.

8. The system of claim 5, wherein the load cell includes one or more strain gauges.

9. A pipelayer comprising:
- a main frame;
- a boom configured to pivot with respect to the main frame to allow lifting and lowering of the boom, the boom defining a first end coupled to the main frame and a second end away from the main frame;
- a first boom block coupled to the second end of the boom;
- a linkage coupled to main frame;
- a second boom block coupled between the linkage and the first boom block;
- a cable engaged with the first boom block and the second boom block and configured to be actuated to pivot the boom; and
- a load cell coupled between the linkage and the second boom block for measuring load, from the cable, on the linkage,
- wherein a measurement load path of the load cell is aligned with a load path of the load between the second boom block and the linkage, and
- wherein a first end of the load cell is directly coupled to the linkage and a second end of the load cell opposite the first end is directly coupled to an engagement portion coupled to the second boom block.

10. The pipelayer of claim 9 includes a winch to actuate the cable to pivot the boom, and wherein the main frame includes a frame associated with the winch.

11. The pipelayer of claim 9, wherein the linkage defines a multi-axis coupling with respect to the main frame of the pipelayer.

12. The pipelayer of claim 11, wherein the multi-axis coupling corresponds to a universal coupling.

13. The pipelayer of claim 9, wherein the linkage includes a clevis bracket pivotable relative to the portion about a first axis of rotation.

14. The pipelayer of claim 13, wherein the pivoting of the clevis bracket about the first axis of rotation enables the linkage to move in a vertical plane defined along a height of the pipelayer.

15. The pipelayer of claim 14, wherein the linkage includes a yoke pivotable relative to the clevis bracket about a second axis of rotation, the second axis of rotation being different from the first axis of rotation.

16. The pipelayer of claim 15, wherein the second axis of rotation is perpendicular to the first axis of rotation.

17. The pipelayer of claim 15, wherein the load cell is coupled to the yoke and is configured to generate a signal corresponding to a tension sustained in the yoke in response to the load from the cable.

18. The pipelayer of claim 15, wherein the load cell includes one or more strain gauges.

* * * * *